Figure 1:
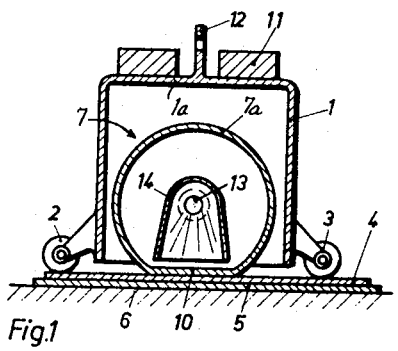

Jan. 5, 1960 O. KRON 2,919,636
CONTACT COPYING DEVICE
Filed Dec. 28, 1954 3 Sheets-Sheet 1

Inventor
Oskar Kron
by Deane Steinhert
attorney

Jan. 5, 1960  O. KRON  2,919,636
CONTACT COPYING DEVICE
Filed Dec. 28, 1954  3 Sheets-Sheet 3

Inventor
Oskar Kron
by Deane Steinberg
attorney

United States Patent Office 2,919,636
Patented Jan. 5, 1960

2,919,636

CONTACT COPYING DEVICE

Oskar Kron, Munich, Germany

Application December 28, 1954, Serial No. 478,108

Claims priority, application Germany January 5, 1954

8 Claims. (Cl. 95—76)

The invention relates to a printing device, and more particularly to a contact printing device having a stationary original copy and a moving light source and a contact member pressing against the superimposed original copy and copying paper.

Printing devices of this kind for copying articles such as sheets of drawings, records, briefs or the like, comprise, as a rule, a glass plate forming the contact member. In order to eliminate this member, which is heavy and fragile, particularly when the matter to be copied has a large size, it has been suggested to replace the glass plate by an endless band consisting of transparent material, which is pressed against the copying paper by means of rollers arranged before and behind the illuminating device. In this way, the undesired glass plate is eliminated; however, a new drawback is incurred because just at the illuminated spot, the matter to be copied is not pressed locally against the carrier of the photosensitive layer, that is, the copying paper. In consequence thereof, a sharp photoprint cannot be obtained with such a copying device if the matter to be copied is, for instance, buckled.

It is an object of the present invention to overcome the drawbacks of the known copying devices.

It is another object of the present invention to provide a copying device which is simple and takes relatively little space.

According to one embodiment of the present invention, the pressure member consists of a transparent taut bag which is flexible and capable of flattening, said bag rolling in operation on the original copy, the illumination of the copy being effected through the transparent bag. A pressure member according to the invention comes into contact directly and exclusively with the illuminated zone of the copy, thus securing sharp photostat copies even if the original copy is rippled or wavy. Furthermore, the flexible bag according to the invention renders it possible to design the copying device in a simple way taking little room.

A copying device with a taut bag as pressing member may be provided in an advantageous manner with an annex for automatic continuous development of the exposed portion of the photosensitive paper by means of the well known semi-wet process. The device according to the invention may also be used with advantage for the reflex contact copying process for which the copying device is preferably provided with a long carrier for the sensitive layer, which is arranged within the housing of the copying device as a roll film cooperating with a winding spool and an unwinding spool, the carrier being moved together with the circumferential contour of the taut bag.

Figure 2:
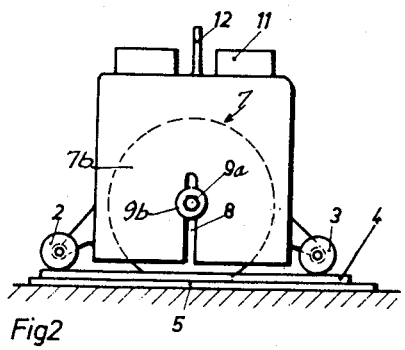
Figure 3:
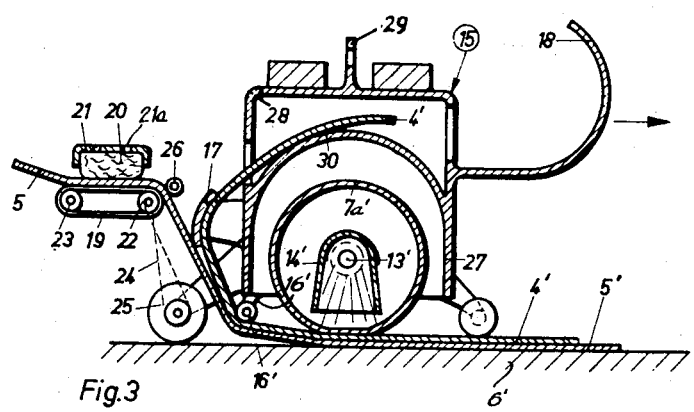
Figure 4:
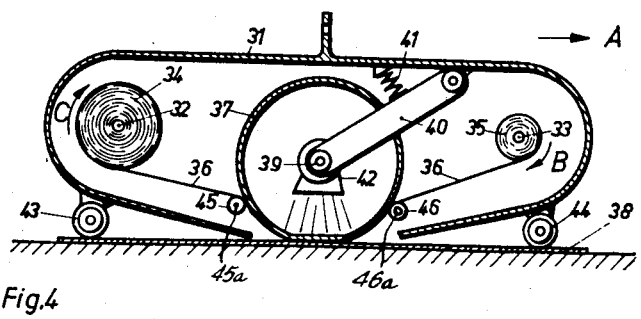
Figure 5:
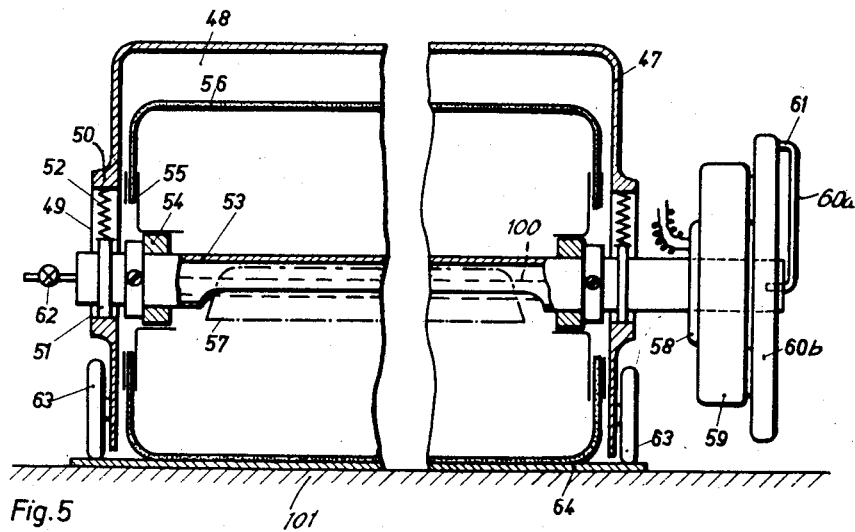
Figure 6:
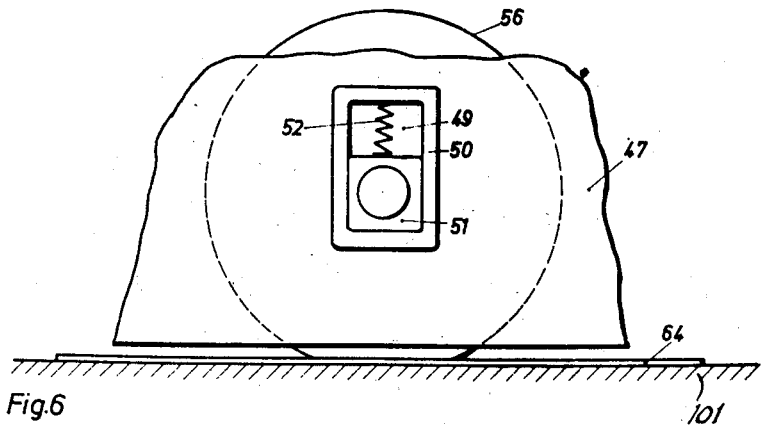
Figure 7:
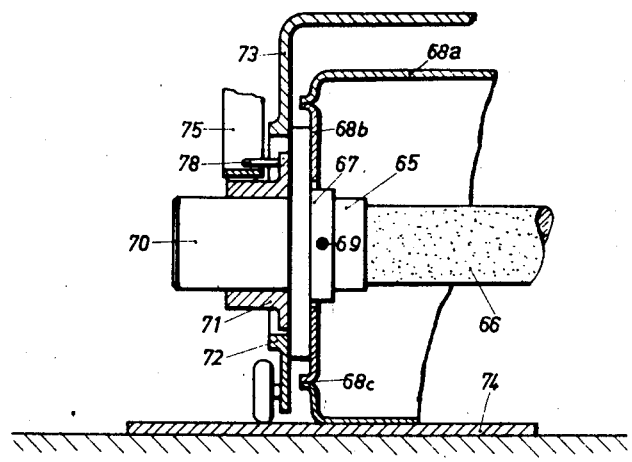
Figure 8:
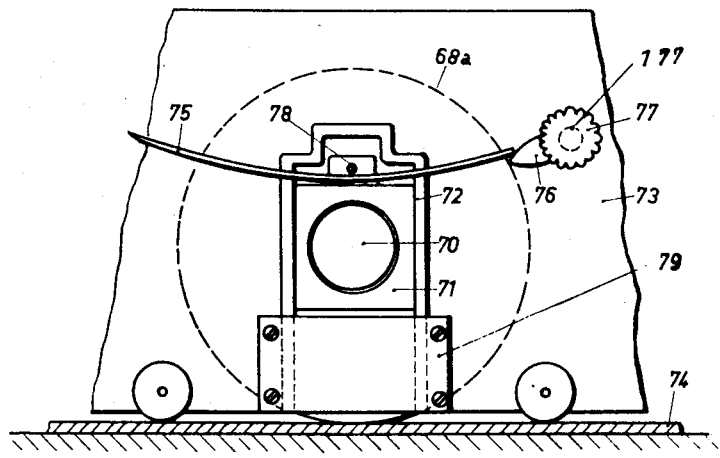

Other objects and advantages of the present invention will become apparent from the following detailed description thereof in connection with the accompanying drawings showing, by way of example, some embodiments of the present invention. In the drawings:

Figs. 1 and 2 are a cross section and a side elevation, respectively, of a copying device according to the present invention, Fig. 3 shows a cross section of a modified embodiment of the present invention, Fig. 4 is a cross section of another embodiment of the present invention, Fig. 5 is cross section of still another embodiment of the present invention, Fig. 6 is a side elevation of some parts shown in Fig. 5, Fig. 7 is a cross section of part of still another embodiment of the present invention, and Fig. 8 is a side elevation, partly in section, of the embodiment shown in Fig. 7.

Referring now to the drawings, and first to Figs. 1 and 2, the copying device according to the invention comprises a casing 1 which is supported by means of wheels or rollers 2, 3 by which is may be moved by hand over the original copy 4, which is immovably arranged. It is assumed that the original copy 4 is transparent, the carrier 5 of the sensitive layer being arranged below and in touch with the original copy 4 and above and in touch with a table plate 6. A pressing member 7 comprises a transparent bag held taut, if desired, by excess pressure of air and consists of a suitable material of low heat sensitivity. The material of the pressing member 7 may be cellulose acetate, for example the material under the registered trade mark "Ultraphan," with a thickness up to 1½ millimeters. This material has a softening point of approximately 70° C. However, it should be understood that other materials having a softening temperature below or above 70° C., and especially one having a softening temperature equal to approximately 50° C., may be used.

The bag 7a of the pressing member 7 has a wall thickness amounting to .2 to .3 millimeter, whereas the substantially flat end faces 7b thereof are somewhat thicker, for instance, have a thickness of .3 to .5 millimeter. The end faces 7b of the bag 7a are provided with hubs (not shown in Figs. 1 and 2, but shown in Fig. 5, reference numeral 55) which are freely rotatable on short axles 9, each of the axles forming a unit with a screw 9a and washer 9b by which the hubs and axles may be fixed with respect to slots 8 of the casing 1, each screw 9a being received in a threaded hole 9c of its axle 9. According to the adjustment of the axles 9 with respect to the slots 8, the flattened part 10 of the bag 7 making contact with the original copy 4, is larger or smaller. In each case, however, the contact area will be of substantial size and of approximately rectangular shape. This will be accomplished under relatively light contact pressure due to the flexibility of the bag. In order to prevent the wheels 2, 3 from being lifted from the original copy 4 when a certain pressure prevails within the pressing member 7, the casing 1 may be made heavier by means of weights 11 arranged on the horizontal portion 1a of the casing 1 at either side of a handle or ledge 12 arranged in the middle of the horizontal portion 1a.

An electric fluorescent glow tube 13 is arranged along the axis of the bag 7 and substantially parallel to the same and each end thereof may be received in an opening 9d of the respective axle 9, the light emitted by the glow tube 13 being reflected by a reflector 14 mounted on the axles 9 so that the light will be directed to the spot to be illuminated, that is the flattened part 10 of the bag 7a. An air valve (not shown) is preferably arranged either within the hub thereof or in one of the end faces 7b; this air valve is preferably designed, in a manner known per se in the art, like a valve for bicycle tires and may serve for an occasional pumping up of the bag 7 in case the pressure within the same drops below a predetermined value.

It is assumed that in Figs. 1 and 2 a tube emitting cold light is used, the surface temperature of which, during operation, does not exceed substantially 35° C. If other tubes growing hotter are used, means should be provided such as those described more in detail hereinafter, for conveying the heat from the tube, said means being preferably connected with means for continually replacing the air within the bag 7.

The length of the casing 1 is dependent on that of the illuminating tube 13 which, in turn, depends on the width of the strip to be illuminated by the moving copying device. If this width amounts, for example, to 210 millimeters, the copying device should have a total length of approximately 300 millimeters so that it may be easily accommodated within a large briefcase. However, with such a portable copying device, original copies of any dimensions may be illuminated by subdividing the same into strips similar to the columns of a newspaper, which strips are photocopied, the photostat copies being put together after development thereof.

The tube 13 may be connected to the mains (not shown) through sliding contacts (not shown) connected with the hubs (not shown) provided in the end faces 7b of the taut bag 7. Alternatively, the illuminating tube may be arranged outside the bag 7, for instance, between the latter and the cover 1a of the casing 1, in which case the illuminating tube is preferably arranged as a stationary part relative to the casing 1 and connected to the cover 1a thereof.

The copying device shown in Figs. 1 and 2 may be used for making copies of opaque original copies by the reflex copying process. In this case, the original copy 4 and the carrier 5 of the sensitive layer change their relative positions. Referring now to Fig. 3, a copying device is shown in cross-section which is a combination of the device shown in Fig. 1 with an automatic developing device for the exposed carrier of the sensitive layer. The transparent original copy 4' is placed on a carrier 5' of the sensitive layer, resting on a table 6'. The original copy 4' is pressed against the carrier 5' by a transparent bag 7' consisting, as in Fig. 1, of cellulose acetate and accommodating in its interior an illuminating tube 13' and a reflector 14'. The operation of these parts is exactly analogous to that of the bag 7, the illuminating tube 13, and the reflector 14 shown in Figs. 1 and 2. However, the casing generally denoted by 15 shows an essential modification over the casing 1 shown in Figs. 1 and 2 and is provided with various additional devices presently to be explained.

The original copy 4' and the carrier 5' of the sensitive layer are not at rest after the exposure but are guided steeply upwards over a guiding roller 16 connected with the casing by arms such as 16' and separated from each other by a curved member 17 arranged outside the casing 15 and carried by same by means of arms such as 17a. The member 17, owing to its curvature, curves the original copy 4' backwards so that it enters the casing 15 through an opening or slot 15a, arranged in one side wall thereof, touches an intermediate semi-cylindrical member 30 forming part of the casing 15 and leading the original copy 4' to a slot 15b arranged opposite to the slot 15a, the slot 15b leading the original copy 4' to a collecting trough 18 arranged outside the casing 15 and forming preferably one piece with the side wall 27 thereof. The member 17 has a length depending on the stiffness and thickness of the original copy 4'. If the original copy 4' consists of a relatively thin material, the member 17 should be longer and extend, if desired, through the slot 15a into the space between the semi-cylindrical member 30 and the cover 28 of the casing 15.

The carrier 5' is conveyed behind the curved member 17 to an endless band 19 above which a strip 20 of felt or the like is arranged within a trough 21 open at the lower side. The strip 20 is maintained in moist condition by water flowing out of a water container (not shown) through openings 21a in the trough 21 to the felt strip 20. The endless band 19, is passed around two rollers 22 and 23, the roller 22 being the driven roller, whereas the roller 23 is rotated by the moving band 19. A crossed belt 24 operatively connects the wheel 25 of the casing 15 with the axle of the roller 22 so as to drive the same. Preferably, the speed of the endless band 19 is somewhat larger than the speed at which the casing 15 is driven, this being accomplished by correspondingly selecting the diameter of a pulley 25' coaxial with and connected to wheel 25, the latter supporting the casing 15 through the bracket 25a. By this arrangement it is achieved that the carrier 5' is tightly pulled by means of the driven roller 22 and an idle roller 26 pressed against the carrier 5' by springs (not shown). Furthermore, the carrier 5' is dragged between the endless band 19 and the wet felt strip 20 so that the photostat copy on the carrier 5' is developed. At the beginning of the copying process the end of the carrier 5' is to be introduced manually into the crevice between the rollers 22 and 26 although, if desired, this step may be automatically performed by means of well known devices, which, however, would complicate the copying device. A ledge 29 is arranged on the cover 28 of the casing 15.

Referring now to Fig. 4 of the drawing a device is shown for making a reflex contact copy from opaque original copies, the carrier of the sensitive layer being arranged in the manner of a photographic roll film within the casing of the copying device. To this end in the casing 31 cores 32 and 33 are supported so as to be freely rotatable. The cores 32 and 33 are under the influence of torsion springs (not shown) which impart to the same a slight reeling tendency with regard to the coils or reels 34 and 35 formed by a carrier 36 covered with a reflex contact copying layer, and dragged along between the transparent bag 37 kept taut by air pressure and the copy original 38 lying on a stationary support 38'. Thereby, the transparent bag 37 is taken along and rotated due to friction against the band 36. The bag 37 is provided at the end faces thereof such as 37a with hubs which are freely rotatable with respect to journal bearings 39 of one or two levers 40 mounted for rotation on stationary parts such as 40' connected to the upper portion of the casing 31. Springs such as 41 supported by the casing 31 urge the levers 40 in a direction towards the surface to be illuminated.

Within the air bag 37 a linear electric fluorescent or glow tube such as shown in Figs. 1 to 3 is arranged, this tube having a direction corresponding substantially to the axis of the bag 37 and directing the light emitted thereby to the carrier 36 by means of a reflector 42. The casing 31 is provided with wheels 43, 44 allowing the same to be moved over the original copy 38 at a speed adapted to the light emission of the tube (not shown) and the sensitivity of the copying layer on the carrier 36.

If the casing 31 is moved in the direction of the arrow A, the carrier 36 is unwound from the reel 35 and wound on the reel 34 as indicated by the curved arrows B and C. During the passage under the reflector 42, the original copy 38 is illuminated by the tube. Two small rollers 45, 46 are arranged for free rotation about axes 45a, 46a rigidly arranged in the casing 31 so as to hold the carrier 36 in nestling position against the air bag 37. If necessary, the carrier 36 may be driven additionally by one of the rollers 45, 46 which in this case, should be driven by one of the wheels 43, 44 through a suitable transmission bringing the speed of the carrier 36 and the circumferential speed of said one of the wheels 43, 44 into conformity with each other.

In the mode of operation which has just been described the copying device including the illuminating means and the carrier of the light sensitive layer are moved with respect to the stationary original copy. However, the same device may be used, if desired, in such a manner that the original copy is arranged on a movable support forming a unit therewith and this unit including the support and the original copy is moved along and below the copying device which in this case is stationary.

Referring now to Figs. 5 and 6 of the drawings, a device is shown having means for a continuous renewal of the gas, as a rule air, in the taut bag so that electric tubes having a higher development of heat may be used as a light source. The side walls 47 of the casing 48 of the device are provided, respectively, with rectangular openings 49 provided with a reinforced border 50 forming the slideway of a rectangular slide 51 engaged by a helical pressure spring 52 urging the slide 51 in a downward direction. The two slides 51 are rigidly connected with a bearing tube 53 closed at both ends thereof and arranged in the longitudinal direction of the device. Bearing sleeves 54 are arranged for free rotation on the bearing tube 53 at a small distance from the two slides 51, respectively, the bearing sleeves 54 being rigidly connected, respectively, with the hubs 55 of the transparent taut bag 56.

The bearing tube 53 is cut out in its middle portion so as to be open toward the lower side thereof and offers a space for accommodating an electric tube 100 indicated in dotted lines and provided with a reflector 57, which is indicated in Fig. 5 likewise by dotted lines. However, if desired, the middle portion of the bearing tube may form the reflector.

For maintaining the transparent bag 56 taut, only a relatively small excess air pressure is needed. To this end, the stator 58 of a small electric motor 59a having an external rotor 59 is secured outside the casing 48 to one end of the bearing tube 53, the rotor 59 being connected by intermediate members 59b with the rotating part 60a of an air compressor 60. From the stationary part 60b of the air compressor 60, which is mounted in a suitable manner on the bearing tube 53, air is conveyed through a conduit 61 into the interior of the bearing tube 53. If desired, deflecting devices (not shown) may be provided for distributing uniformly the introduced air over the entire luminescent tube. The other end of the bearing tube 53 is formed as an air exit and preferably provided with an adjustable member 62 controlling the air flow.

The casing 48 of the device is provided with wheels 63 by means of which it may be moved over the original copy 64 resting on the carrier 101 provided with a photosensitive layer and arranged on a stationary base member 102. The lower edge of the side wall 47 of the casing 48 may be provided with a ribbon 103 of velvet or the like which acts as a light screen. An automatic motion of the copying device over the original copy 64 may be effected by connecting one or more of the wheels 63 with an electric motor or a spring motor (not shown). On the other hand, if the motion is effected by hand, the wheels 63 may be omitted provided a resting member is arranged at the lower edge of the wall 47 of the casing 48 and is sufficiently sturdy.

The bearing tube 53 may be replaced by a suitably formed bearing member which may be of sturdy, generally solid structure and be provided, especially at the ends thereof, with suitable borings and channels (not shown) for admitting and carrying off air. The electric motor 59a may be used, if desired, for driving one or more of the wheels 63.

Referring now to Figs. 7 and 8 of the drawings, it is supposed that the illuminating tube is a cold tube so that no means have to be provided for withdrawing heat from the taut bag. Accordingly, the structure of the device shown in Figs. 7 and 8 is much simpler than that shown in Figs. 5 and 6, the illuminating tube 66 itself forming a supporting structural element. In order to accomplish this, a sleeve 67 is slid on each end socket 65 of the illuminating tube 66 and secured in position by suitable means such as a set screw 69, the sleeve 67 being tightly connected with a disc 67a tightly connected with the end face 68b of a taut bag 68, for instance, by gluing. The bag 68 includes a cylindrical part 68a connected by a short flange-like part 68c with the end face 68b. The part 70 of the end socket 65 protruding from the sleeve 67 forms an axle journal which is rotatably arranged within a bearing 71 formed in a slide block 71a arranged for displacement at right angles to the original copy 74 in a flange portion 72 of the end wall 73 of the casing. The slide block 71a is urged by a leaf spring 75 secured to the wall of the casing toward the original copy 74 but after completion of an operation may be moved upwards by a cam 76 connected with a knob 77 arranged for rotation on an axle or shaft 177, the ascending leaf spring 75 contacting a pin 78 secured to the slide block 71a so as to raise the same so that the lower portion 68d of the bag 68 is lifted from the original copy 74. The same arrangement is provided at the other end (not shown) of the taut bag 68, the cam 76 and its counterpart being connected with each other by the shaft 177. In order to enable the tube 66, the bag 68, and the bearings such as 71, to be inserted in, and removed from the casing 73 as a whole, preferably the flange portion 72 of the casing is prolonged downward and ends in line with the lower edge of the wall 73 of the casing, the missing part of the wall 73 being replaced by a cover plate 79 having an upper edge limiting the pressing of the bag 68 against the original copy. The opening of the frame 73 above and below the axle part 70 is preferably made impervious to light by shutters (not shown) of leather or the like. The original copy 74 is superimposed upon a carrier 110 bearing a photo-sensitive layer and arranged in turn on a stationary base member 80.

It has been found that, particularly when the axial length of the bag does not exceed the diameter thereof by a large amount or not at all, and when the original copy is completely smooth, it is unnecessary to maintain any excess pressure within the bag which may be kept perfectly cylindrical outside the flattened part thereof by the natural stiffness of the walls of the bag which should be imparted a sufficient thickness. In this way, a perfect shape of the bag may be secured even without maintaining any excess pressure therein. For instance, the flat end walls or faces of the bag consisting of cellulose acetate may be made with a thickness amounting to .3 to .5 millimeters, whereas the walls of the cylindrical part of the bag may be .2 to .3 millimeters thick as described hereinbefore.

Any undesired slipping of the plane part of the cylindrical face of the bag relative to the part with which it comes into contact such as the original copy or the carrier of the photosensitive layer, may be prevented by providing the cylindrical face of the bag with knurled or roughened surfaces.

The reflector associated with the luminous tube is preferably imparted a reflecting surface securing a uniform illumination of the field to be exposed, particular care being given that the narrow corners of the small rectangular field are not neglected.

If the carrier 36 of the photosensitive layer is arranged, as shown in Fig. 4, in coils such as 34 and 35, means known per se in the art of roll film cameras may be used for mounting the carrier 36 in and removing it from the casing 31. Also instead of a long strip of copying paper, a plurality of subsequent sensitized sheets may be used which are rolled or loosely held by a transparent intermediate carrier of corresponding length. This intermediate carrier may be transparent where it is in contact with the sensitized sheets and opaque at places therebetween. In a similar manner, a carrier forming one piece may be covered by a photosensitive layer only at predetermined places. In both cases, the carrier and/or the intermediate carrier may be provided with markings appearing in a window of the casing 31 and enabling the operator to check the degrees to which the carrier has been used up and the position thereof.

It should be understood that in Figs. 1–8 the original copy and/or the carrier of the photosensitive layer are shown at an exaggerated thickness for reasons of distinctness.

I also wish it to be understood that numerous changes in the parts disclosed hereinabove or substitution of equivalents may be made in my invention without sacrificing any of its attendant advantages, the new and useful aspects of my invention being defined by the appended claims.

I claim:

1. A contact copying device for reproducing an article on a photosensitive sheet, said article and sheet being superimposed upon each other, comprising a transparent hollow roller and means in said roller, for providing light rays for copying; said hollow roller to be rolled over the article and having a flexible curved circumferential wall portion, and means for lightly pressing a part of this flexible wall portion against the superimposed article and sheet to establish contact of said wall portion and the article, over a rectangular area by flattening said curved wall portion in the contacting zone.

2. A device as claimed in claim 1, said hollow roller consisting of cellulose acetate.

3. A device as claimed in claim 2, said cellulose acetate forming said hollow roller having a stiffness imparting to the walls of said hollow roller a rigidity sufficient to maintain the unflattened portion of the roller in its original form.

4. A contact copying device for reproducing an article on a photosensitive sheet, said article and sheet being superimposed upon each other, comprising, in combination, a light source and a transparent hollow roller to be rolled over the article; said hollow roller consisting of cellulose acetate, said light source being arranged inside said transparent hollow roller approximately in the axis thereof, said hollow roller having a flexible curved circumferential wall portion, and means for gently pressing said curved wall portion against the superimposed article and sheet to establish contact with said wall portion over a substantially rectangular area by partially flattening said curved wall portion; and means for maintaining excess pressure in the said hollow roller so as to impart to the same a substantially cylindrical shape.

5. A device as claimed in claim 4, including a casing partially enclosing said hollow roller, said hollow roller having substantially flat end walls, hubs arranged, respectively, in said flat end walls, and axles arranged in the wall of said casing, said hubs being freely rotatable about said axles.

6. A contact copying device for reproducing an article on a photosensitive sheet, said article and sheet being superimposed upon each other, comprising, in combination, a light source, a transparent hollow roller to be rolled over the article, said hollow roller consisting of cellulose acetate, said light source being arranged inside said transparent hollow roller approximately in the axis thereof, said hollow roller having a flexible curved circumferential wall portion, a casing partially enclosing said hollow roller, said hollow roller having substantially flat end walls, hubs arranged, respectively, in said flat end walls, a bearing tube assembly carrying said hubs, slots arranged in the wall of said casing and guiding said assembly for movement transversely to the article, and means urging said assembly towards the article to establish contact between said curved wall portion and the superimposed article and sheet over a substantially rectangular area while flattening said curved wall portion partially.

7. A device as claimed in claim 6, including an electric motor having an inner stator and an outer rotor, said stator being arranged on a part of said bearing tube extending outside said casing, a compressor connected to said rotor, said compressor delivering air under excess pressure, and means for supplying said air under excess pressure to said bearing tube, said tube communicating with the interior of said hollow roller to maintain pressure therein.

8. A contact copying device for reproducing an article on a photosensitive sheet, said article and sheet being superimposed upon each other, comprising, in combination, a light source, a transparent hollow roller to be rolled over the article, said hollow roller consisting of cellulose acetate, said light source being arranged inside said transparent hollow roller approximately in the axis thereof, said hollow roller having a flexible curved circumferential wall portion, a casing partially enclosing said hollow roller, said hollow roller having substantially flat end walls, hubs arranged, respectively, in said flat end walls, end sockets forming part of said light source, said flat end walls being tightly connected with said end sockets, axles formed by parts of said end sockets, bearings arranged in said casing, said axles being rotatably arranged in said bearings; and means for gently pressing said curved wall portion against the superimposed article and sheet to establish contact with said wall portion over a substantially rectangular area by partially flattening said curved wall portion.

References Cited in the file of this patent

UNITED STATES PATENTS

| | | |
|---|---|---|
| 1,251,076 | Mauch | Dec. 25, 1917 |
| 2,290,478 | Matlas | July 21, 1942 |
| 2,292,668 | Sheridan | Aug. 11, 1942 |
| 2,335,742 | Creange | Nov. 30, 1943 |
| 2,514,892 | Miller et al. | July 11, 1950 |
| 2,518,208 | Weiss | Aug. 8, 1950 |
| 2,616,344 | Patience et al. | Nov. 4, 1952 |